Figure 2:
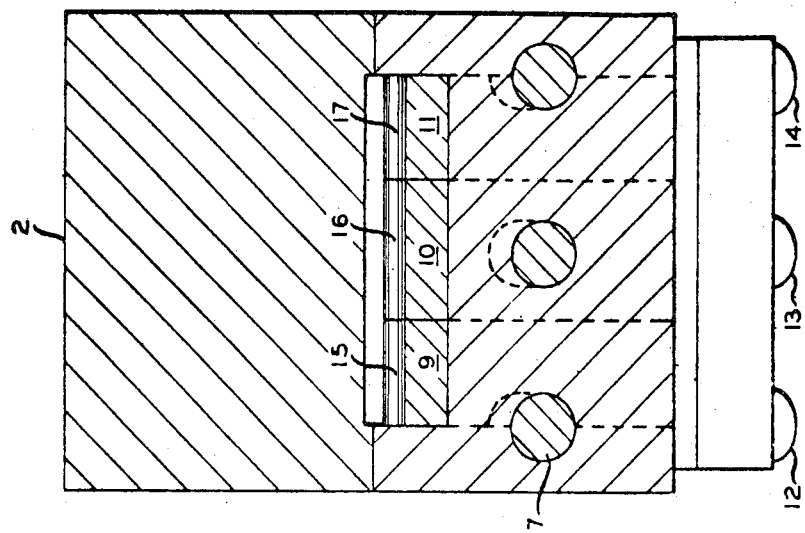

United States Patent [19]
Carrow

[11] 3,815,637
[45] June 11, 1974

[54] MEANS FOR FLOW CONTROL OF THERMOPLASTIC MATERIAL

[75] Inventor: Guy E. Carrow, Bartlesville, Okla.

[73] Assignee: Phillips Petroleum Company, Bartlesville, Okla.

[22] Filed: Oct. 4, 1971

[21] Appl. No.: 186,453

Related U.S. Application Data
[63] Continuation of Ser. No. 847,311, Aug. 4, 1969, abandoned.

[52] U.S. Cl............ 138/45, 264/176 R, 264/177 R, 425/376, 425/461, 425/466
[51] Int. Cl............................. B29f 3/06, F15d 1/02
[58] Field of Search...... 264/176 R, 177 R, 40, 171; 425/466, 467, 378, 145, 206, 376, 461; 138/45, 43

[56] References Cited
UNITED STATES PATENTS

| | | | |
|---|---|---|---|
| 1,956,564 | 5/1934 | Crane et al. | 264/177 R |
| 2,053,920 | 9/1936 | Schape et al. | 425/461 |
| 2,402,281 | 6/1946 | Green | 264/177 R |
| 3,030,665 | 4/1962 | Eagleton et al. | 264/176 R |
| 3,057,010 | 10/1962 | Reifenhauser | 425/466 |
| 3,117,342 | 1/1964 | Koppehele | 264/177 R |
| 3,273,202 | 9/1966 | Zygan | 264/177 R |

Primary Examiner—Jeffery R. Thurlow

[57] ABSTRACT

A means for producing a desired distribution of thermoplastic in an extrudate which involves inserting into the flow path of the extrudate prior to the die at least one flow deflector means to redistribute the flow of the extrudate in the passageway.

6 Claims, 4 Drawing Figures

PATENTED JUN 11 1974
3,815,637
SHEET 2 OF 2

MEANS FOR FLOW CONTROL OF THERMOPLASTIC MATERIAL

This application is a continuation of application Ser. No. 847,311, filed Aug. 4, 1969, now abandoned.

This invention relates to means for thermoplastic flow control.

In one of its more specific aspects this invention relates to an apparatus for controlling extruded thermoplastic shapes.

The extrusion of thermoplastic materials is well known. Generally such processes involve extruding a thermoplastic material through a die at a temperature at which the extrudate can be shaped as desired. Such processes frequently are adapted to produce an extrudate having an elongated profile and considerable width.

When producing such sheet or slab, it is desirable that the sheet be uniform in all dimensions. However this is not easily accomplished due to variations in the rheological properties of thermoplastic, variation in operating conditions, and the like.

In order to minimize such nonuniformities, there have been developed various flow control means commonly called "chokes" or "choke bars." It is customary to place such a choke in the extrudate flow path just upstream of the die. The choke directs the path of the plastic flow and establishes and maintains uniform flow patterns of the plastic. Such devices, however, have been found limited in respect to the configuration of the extrudates which they are able to produce, principally as to the width and thickness of the sheet. The thermoplastic flow control method and means which is supplied by this invention is an improved device which eliminates that limitation.

According to this invention there is provided a method of thermoplastic flow control which comprises passing an extrudate through a passageway and projecting into the passageway at least one flow diverting means to redistribute the flow of the extrudate as it contacts the flow diverting means.

Also according to this invention there is provided a thermoplastic flow control means which comprises a housing, a passageway through the housing, at least one flow diverting means adjustably positionable within the passageway to redistribute the flow through the passageway.

Accordingly, it is an object of this invention to provide a method for producing a thermoplastic extrudate of uniform dimensional quality.

It is another object of this invention to provide an apparatus which facilitates the production of thermoplastic extrudate of improved quality.

Figure 1:
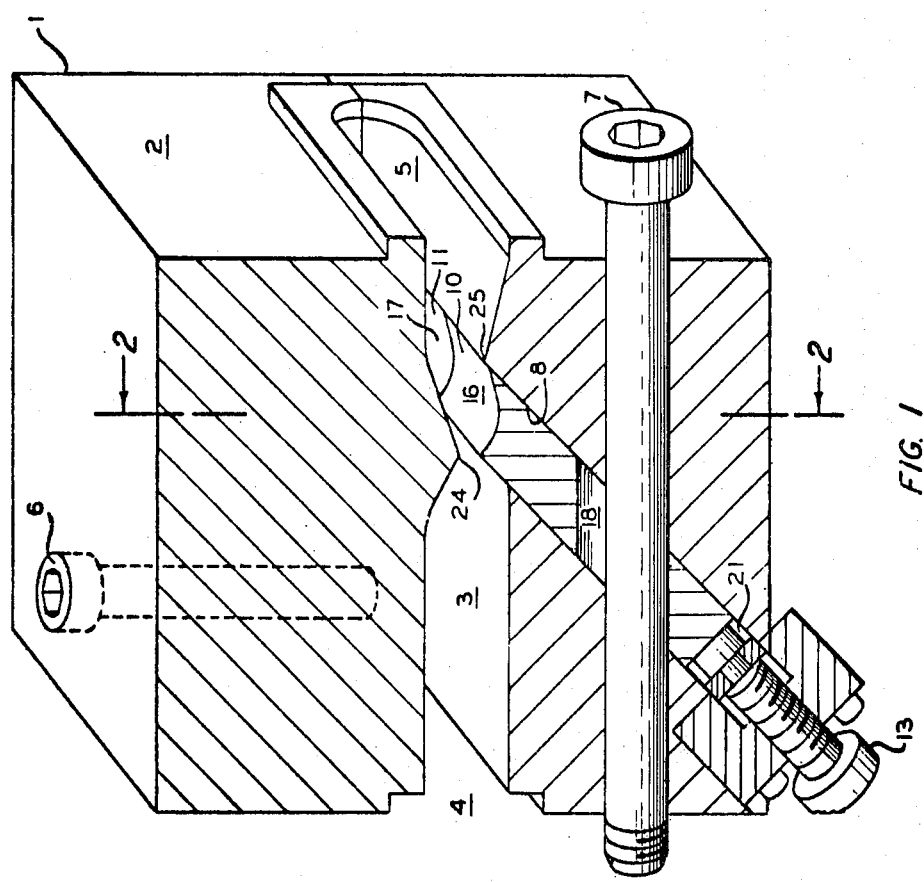
Figure 4:
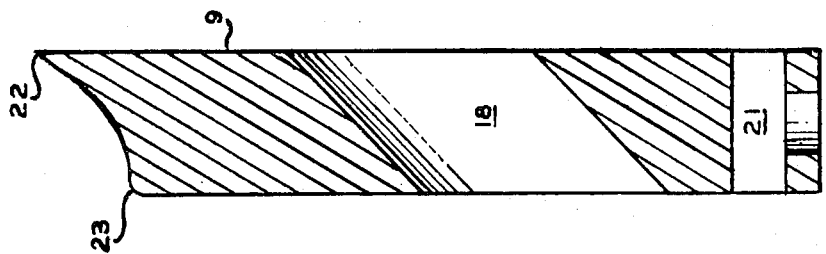
Figure 3:
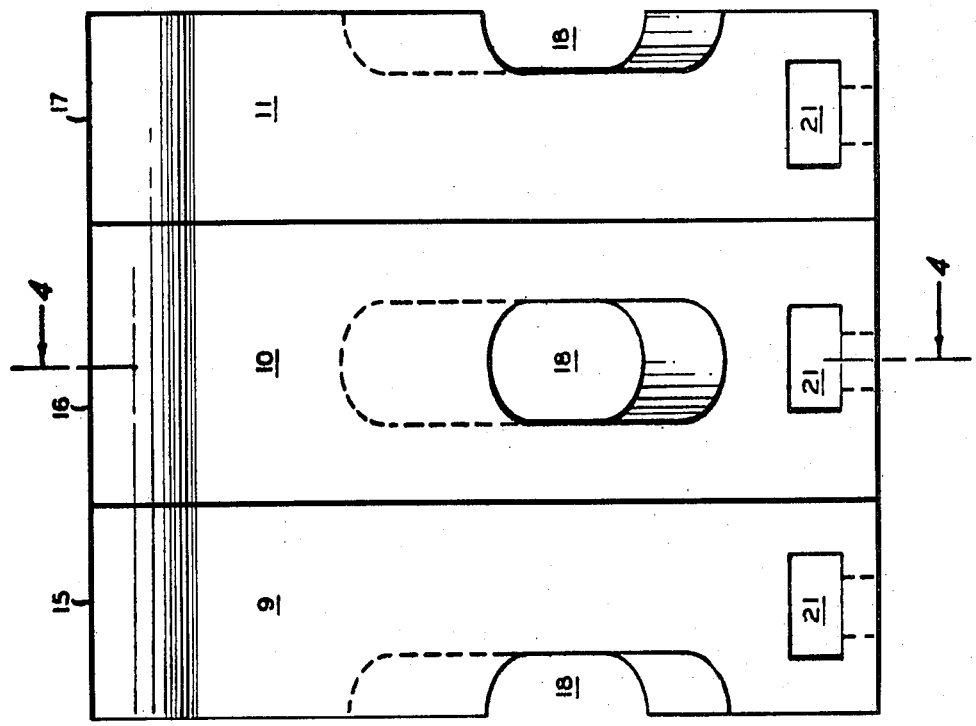

The method and apparatus of this invention will be more easily understood if explained in conjunction with the attached drawings which depict one embodiment of this invention. FIG. 1 is an isometric view in partial cross section of the choke of this invention; FIG. 2 is a sectional view taken through section 2—2 of FIG. 1; FIG. 3 is a detailed view of a particular feature of the apparatus; and, FIG. 4 is a sectional view taken through section 4—4 of FIG. 3.

It is to be understood that these drawings illustrate but one embodiment of this invention and are not to be considered as limiting the invention thereto.

Referring now to FIG. 1, there is shown choke 1 which comprises a housing 2 having passageway 3 extending therethrough from extrudate entry port 4 to extrudate exit port 5. Housing 2 can be of any size and configuration suitable for the high pressures employed and may be provided with internal or external heating means. Passageway 3 will be of any desired dimensions with entry port 4 and exit port 5 being adapted for attachment to the extruder bore discharge and to the die inlet, respectively,. Housing 2 will be preferably formed of a plurality of sections maintained in unitary relationship by vertical fastening bolts 6 and horizontal fastening bolts 7, the latter being advantageously extended through the housing to facilitate interconnection of the housing to the extruder.

Opening into housing 2, either upwardly or downwardly, is channel 8 which communicates with passageway 3. Positioned within channel 8 is at least one and preferably any plurality of choke bars 9, 10 and 11 which are adjustably and individually positionable within channel 8 by positioners 12, 13 and 14.

Channel 8 forms a passageway in communication at its inner end with passageway 3. It is closed at its opposite end by positioners 12, 13 and 14 which position choke bars 9, 10 and 11 within channel 8. Channel 8 may be of any suitable dimension along the axis of flow through passageway 3 and, in its width, that is, in that dimension transverse to the direction of flow through passageway 3, channel 8 will preferably be equal to that corresponding dimension of passageway 3. Preferably, channel 8 will be angularly positioned to intercept passageway 3, being angled in the direction of flow through passageway 3. While of less preferable construction, channel 8 can be comprised of a plurality of partitioned sections of any suitable number.

Choke bars 9, 10, and 11 are individually disposed in channel 8. Any suitable number of choke bars can be employed, their number depending primarily upon the width of the extrudate being produced and the degree of control required in its formation. Choke bars 9, 10, and 11 are positioned in lateral contact with each other and are of substantially equal width. Preferably, their contacting sides are machined to facilitate unimpeded movement of adjacent bars while minimizing flow from passageway 3 down into channel 8.

While these choke bars may be of any width and may all be of equal dimensions, some additional degree of control is attainable in that instance in which a number of choke bars greater than two are employed, and where the inner positioned choke bars are of slightly greater width than the outer choke bars. Each choke bar is comparable in construction, configuration and operation, and the subsequent description of a particular choke bar is equally applicable to any of the plurality of choke bars employed.

The choke bars are moved into passageway 3 by means of individual positioning mechanisms 12, 13, and 14 which are threaded within housing 2, and which are comparable to advancing and retracting jackscrew mechanisms. These enable the positioning of inner ends 15, 16, and 17 of choke bars 9, 10, and 11 within passageway 3. Optionally, a choke bar can bear against its adjusting mechanisms or can be suitably affixed thereto by interrelation of slot 21 of the bar in the positioning mechanism.

Each choke bar is adapted with an aperture 18 near its midpoint through which fastening bolt 7 extends. Aperture 18 is of elongated slotted configuration to permit movement of the choke bar along the length of channel 8 but to prevent its choke bar from being so far advanced through channel 8 that its end 15 can be seated against the upper wall of passageway 3 so as to obstruct the flow of extrudates therethrough. For this purpose aperture 18 is sized so that its lower edge contacts fastening bolt 7 before contact occurs between its upper end 15 and the upper surface of passageway 3. Preferably, the upper limit of travel of the choke bar is reached when its leading edge 22 is at or slightly below protrusion 25 in passageway 3. If desired, however, only one choke bar can be limited so that its inner end cannot be seated against the upper wall of passageway 3, that is, the choke bar will be positionable in the passageway to a distance less than that required to transverse the passageway.

FIG. 3 illustrates choke bars of one embodiment of this invention. Each is adapted with a leading edge 22, and a trailing edge 23.

Referring now to FIG. 4, there is shown a cross-sectional view of a typical choke bar of this invention. It will be seen that aperture 18 penetrates bar 9 at an angle equal to that angle at which channel 8 communicates with passageway 3. It will also be seen that its inner end 15 is of irregular configuration. Both leading edges 22 and trailing edges 23 of the choke bar are of such configuration as to avoid the creation of any irregularities in the configuration of passageway 3 when the bar is withdrawn into channel 8 to its fullest extent as limited by fastening bolt 7. For this purpose trailing edge 23 is preferably rounded with leading edge 22 being brought to an apex. The configuration of the passageway and choke bars provides streamliked flow of plastic and avoids dead spots where plastic could otherwise collect, degrade and slough off into the extrudate since the flow is directed and is self-wiping.

Referring again to FIG. 1, it will be seen that passageway 3 proximate its intersection with channel 8 has its upper wall adapted with downward protrusion 24 and itw lower wall adapted wtih upward protrusion 25. While the choke bars act principally to effect lateral adjustment of the thermoplastic flow through passageway 3, protrusions 24 and 25, in conjunction with the choke bars, act to effect vertical adjustment of the thermoplastic flow. It will be noted that upon withdrawal of the choke bars to their most retracted positions there is created a depression proximate the inner ends of the choke bars. However, downward protrusion 24, being substantially congruent with the depression so created, acts to maintain substantially the same flow area across the inner ends of the retracted choke bars as is maintained at other points throughout the length of passageway 3. It will also be noted that leading edge 22 and trailing edge 23 of the choke bars are of such configuration that, at any positioning in respect to their projection into passageway 3 or their withdrawal therefrom, there is formed, proximate their inner ends, an area of minimized flow turbulence.

In the operation of this apparatus, it will be seen that adjustment can be made to any of the three dimensions of the extrudate by adjusting the extent to which any individual choke bar or combination of choke bars extends into channel 3 to divert the flow therethrough. For example, should the extrudate tend to be of too great a dimension along its one edge, an adjustment of the choke bar into passageway 3 at that edge will act to divert a portion of the flow through the passageway from that edge and redistribute it at other points across the passageway with the result that a more uniformly dimensional extrudate is produced. This is especially desirable when the extrudate emerged from the die in essentially solidified form and post-extrusion treatment to correct dimensional deviations is largely ineffective and/or difficult to achieve. It will be appreciated that this method and apparatus may be employed to produce any desired profile of the extrudate whether such profile represents an even or uneven distribution of that material constituting the extrudate, or distribution lateral to the passageway or vertical to the profile of the extrudate, or any combination thereof.

It will be appreciated that various modifications can be made to the method and apparatus of this invention as described herein. For example, the choke bars can be made to operate in a downward direction, positionable in the passageway at an angle against the direction of flow therethrough. Similarly, a plurality of choke bars sequentially arranged to extend into the passageway along its length can be employed. These and other modifications are, however, in light of the foregoing discussion considered to be within the scope of this invention.

what is claimed is:

1. Apparatus for controlling the profile of an extrudate comprising:
    a. a housing;
    b. a passageway through said housing;
    c. a plurality of flow distribution means positioned in lateral contact within a channel and extending across a substantial portion of the width of said passageway, said flow distribution means being individually projectably positionable into said passageway, the axes of said distribution means being angularly inclined in the direction of the passageway of said extrudate through said passageway to distribute the flow of extrudate across the width of said passageway, each of said flow distribution means being adapted with a leading edge and a trailing edge with a concavity formed between said edges; and,
    d. a downwardly-projecting protrusion extending across the width of said passageway, said protrusion being positioned congruent of said concavity.

2. The apparatus of claim 1 in which said trailing edge is of rounded configuration and said leading edge is formed of an apex.

3. The apparatus of claim 1 comprising means to limit the extent of the projection of said flow distribution means into said passageway.

4. The apparatus of claim 1 in which said flow distribution means are of unequal width.

5. The apparatus of claim 1 in which said flow distribution means are of rectangular cross section.

6. The apparatus of claim 2 in which said flow distribution means positioned adjacent the walls of said channel have a width less than than the width of said flow distribution means positioned in spaced relationship from the walls of said channel.

* * * * *